H. E. EAGER & A. O. HAGEE.
SLEET CUTTER FOR TROLLEY WIRES.
APPLICATION FILED FEB. 17, 1914.
1,117,815.
Patented Nov. 17, 1914.
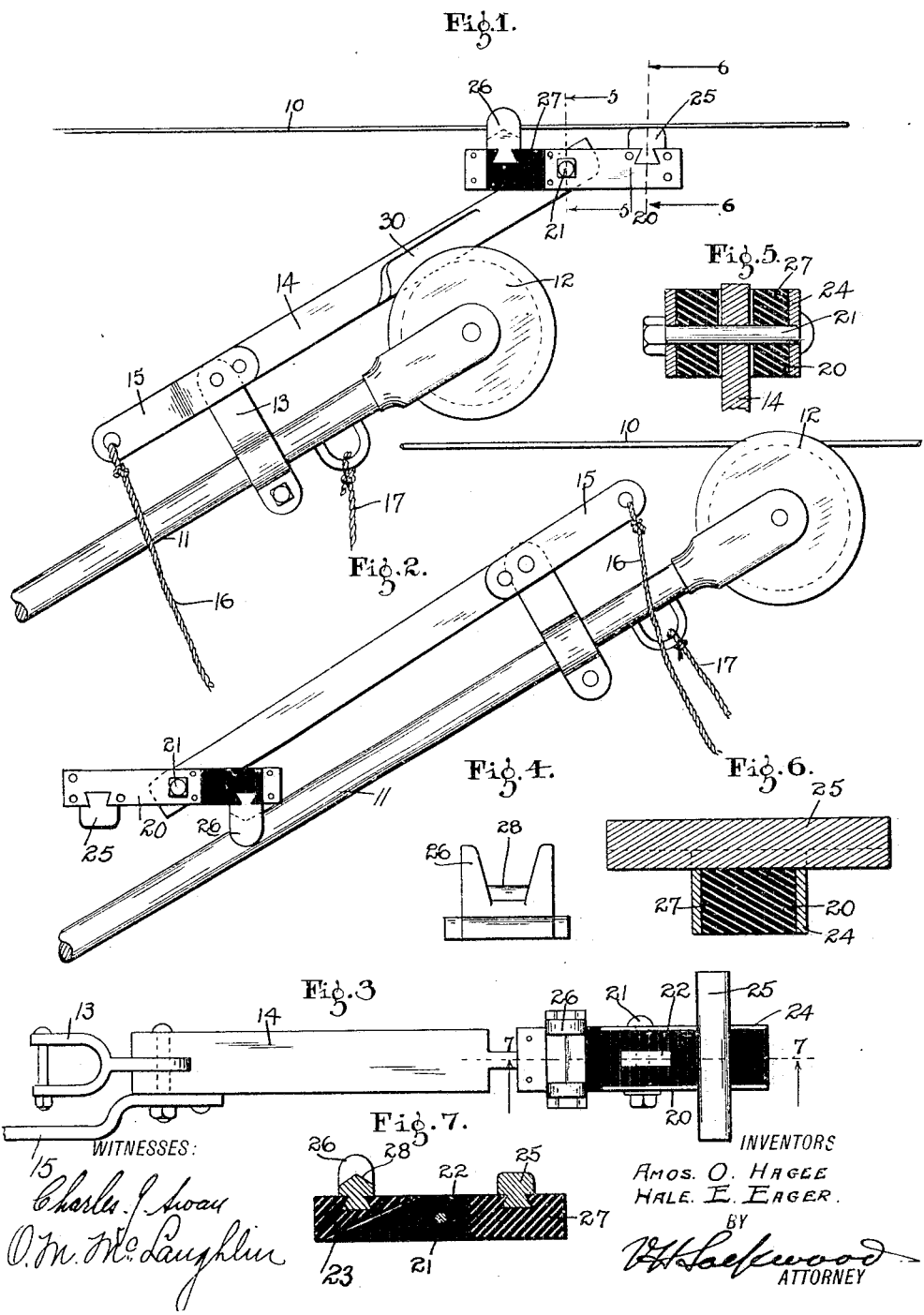
WITNESSES:
Charles J. Swan
O. M. McLaughlin
INVENTORS
Amos. O. Hagee
Hale. E. Eager.
BY
T. H. Lockwood
ATTORNEY

UNITED STATES PATENT OFFICE.

HALE E. EAGER AND AMOS O. HAGEE, OF TIPTON, INDIANA.

SLEET-CUTTER FOR TROLLEY-WIRES.

1,117,815. Specification of Letters Patent. Patented Nov. 17, 1914.

Application filed February 17, 1914. Serial No. 819,178.

*To all whom it may concern:*

Be it known that we, HALE E. EAGER and AMOS O. HAGEE, citizens of the United States, and residents of Tipton, county of Tipton, and State of Indiana, have invented a certain new and useful Sleet-Cutter for Trolley-Wires; and we do hereby declare that the following is a full, clear, and exact description thereof, reference being had to the accompanying drawings, in which like letters refer to like parts.

The object of this invention is the removal of sleet or ice which accumulates on a trolley wire by means which will be permanent and not burn out quickly, and is adapted to be attached to the trolley pole so that it can be readily moved into a position for use or out of such position.

In the usual devices of the kind heretofore employed for this purpose the current passed through the scraper and soon heated and destroyed the scraper. Herein the scraper is always cold, no current passing through it, and an independent contact is provided. These two parts, the sleet cutter and contact are mounted on a pivotal means so said sleet cutter and contact will always be in engagement with the wire regardless of the variations in the wire or the travel of the car and which result would not ensue if said parts were fixed.

Another feature of the invention consists in pivotally mounting said sleet cutter on the trolley pole where it can be readily thrown down out of the way on the pole, or as readily thrown up into position for use. When thrown into position for use, it rests or is supported upon the trolley wheel. The device is readily detached or attached to the trolley pole so that when sleety weather comes, the device can be put on the trolley pole and when the need for its use occurs, it can be thrown up into position for use by pulling a cord or at times when not needed can be thrown down upon the trolley pole out of its position for use. Often in one trip of the car at one end of the line such sleet cutter will be needed, while at the other part of the line there will be no sleet and the device not needed. It is important, therefore, that such device be capable of instant movement into position for use or out of position of use without delaying the car.

The full nature of the invention will be understood from the accompanying drawings and the following description and claims.

In the drawings, Figure 1 is a side elevation of the trolley wire and the upper part of the trolley pole and the sleet cutter thereon in operative position. Fig. 2 is the same with the sleet cutter turned down out of the way. Fig. 3 is a plan view of the upper part of the sleet cutter mechanism. Fig. 4 is a front elevation of the sleet cutter element. Fig. 5 is a section on the line 5—5 of Fig. 1. Fig. 6 is a section on the line 6—6 of Fig. 1. Fig. 7 is a section on the line 7—7 of Fig. 3.

There is shown herein the usual trolley wire 10, trolley pole 11 and trolley wheel 12. A removable arm 13 is clamped to the trolley pole below the trolley wheel, as shown in Fig. 1, and on it a bar 14 is pivoted at one end and an arm 15 is secured rigidly to said bar 14 so as to extend on the other side of the pivot, and a cord 16 is connected with the free end of said bar 15 so that it can be pulled downward and thrown from the position shown in Fig. 1 to that shown in Fig. 2 and vice versa. The trolley has a cord or rope 17 attached to it as usual for drawing the trolley pole down.

The upper end of the bar 14 is reduced transversely, as shown in Fig. 3, and projects into a centrally located slot 22 in a bar 20 where it is pivoted by a bolt 21 so that the bar 20 can rock longitudinally within limits on the bar 14. The rear vertical wall of a slot 22, as it appears in Fig. 7, is vertical and that limits the downward oscillation of the rear end of the bar 20 so that said bar cannot move in that direction beyond a right angular position with reference to bar 14. The oscillation in the opposite direction is limited by the left-hand end of the bar 20 coming down upon the bar 14 by reason of an inclined wall 23. This is merely to prevent the bar 20 from oscillating so far backward on the bar 14 that it can not automatically take its position under the trolley wire. On the rear end of the bar 20 there is a metal contact piece 25 dove-tailed transversely so that it can be removed if desired. The part 25 is a metal bar with a flat top and rounded edges so as not to wear the wire much, and makes contact through the metal plates 24 and bolt 21 to the bar 14.

The sleet cutter element 26 is mounted transversely on the other end of the bar 20, dove-tailed in a piece of insulation material 27 so that the element 26 may be readily removed and replaced.

As shown in Fig. 4, the sleet cutter has on each side an upwardly extending arm which projects above and beyond the trolley wire and there is a recess between the two arms of the cutter 26 for a wire which is engaged on the underside by a cutting surface 28. This may be made in any form. Here it is shown tapering upward, but a number of sleet cutters 26 are made with differently formed surfaces 28 and one is chosen at any particular time according to the condition of the sleet on the trolley wire. If it is very hard and cold, a sharp cutter surface 28 is employed, as shown, but if the sleet comes off rather easily, a cutter surface which cannot so sharply engage the wire is used. A sleet cutter 26 precedes the contact 25 and removes the sleet in advance of said contact. It is also noted that the sleet cutter element 26 is insulated and, therefore, always cold and not injured by the heat due to the arcing of the electricity.

The underside of the bar 14 midway its ends is made V-shape in cross section at 30 so that it can ride and be supported on the trolley wheel 12 and be held from lateral displacement by the trolley wheel. The bar 20 can rock longitudinally so that the sleet cutter 26 and the contact bar 25 will always be in engagement with the wire 10.

When the sleet cutter is no longer needed, the conductor of the car draws the trolley pole down by the rope 17 so as to disengage the parts from the trolley wire and then he draws the cord 17 and throws the sleet cutting apparatus over through a semi-circle and down to the position shown in Fig. 2 where the bifurcated sleet cutter 26 rests on and astride the trolley pole and thus the sleet cutter element holds the sleet cutter apparatus from lateral displacement while not in use. The conductor releases his rope 17 and trolley wheel engages the trolley wire and operates as in the ordinary shift. Thus the device can be put into or out of use in a minute.

When the sleet storm is over and no sleet cutter is needed at all, it is unclamped from the trolley pole and put away in the car for use the next time the trolley wire is coated with sleet.

The invention claimed is:

1. In a device of the kind, a bar pivoted between its ends, a contact on said bar to the rear of the pivot, and a sleet cutter mounted on said bar in front of the pivot and insulated therefrom.

2. In a device of the kind, a bar pivoted between its ends, a contact removably dovetailed in position on said bar to the rear of the pivot, insulation in said bar in front of the pivot, and a sleet cutter removably dovetailed in said insulation.

3. The combination with a trolley pole and trolley wheel, of a bar pivotally mounted on said trolley pole between its ends and when in its upper position adapted to rest between its ends on the trolley wheel between its flanges, a bar pivotally mounted between its ends on the upper end of said first-mentioned bar, a contact on said last-mentioned bar to the rear of its pivot, and a sleet cutter insulatably mounted on said last-mentioned bar in advance of its pivot.

4. The combination with a trolley pole and trolley wheel, of a bar pivotally mounted on said trolley pole between its ends and when in its upper position adapted to rest between its ends on the trolley wheel between its flanges, a bar pivoted between its ends to the upper end of said first-mentioned bar and so that the oscillation of said last-mentioned bar will be limited, a contact on said last-mentioned bar to the rear of its pivot, and a sleet cutter insulatably mounted on said last-mentioned bar in advance of its pivot.

5. The combination with a trolley pole and trolley wheel, of an arm clamped at a right angle to the trolley pole below the trolley wheel, a bar pivoted at one end to said arm, a bar pivotally mounted between its ends to the other end of said bar, a contact on the last-mentioned bar to the rear of its pivot, a sleet cutter on the last-mentioned bar to the front of its pivot, an arm extending from the first-mentioned bar beyond its pivot, and a cord connected with the front end of said arm.

6. The combination with a trolley pole and trolley wheel, of sleet cutting mechanism pivotally mounted between its ends on the trolley pole, and a cord extending down from the shorter end thereof for throwing the sleet cutting mechanism up into position of use or down into position of disuse by gravity.

In witness whereof, we have hereunto affixed our signatures in the presence of the witnesses herein named.

HALE E. EAGER.
AMOS O. HAGEE.

Witnesses:
MORGAN JONES,
CHARLES E. HUTTO.

Copies of this patent may be obtained for five cents each, by addressing the "Commissioner of Patents, Washington, D. C."